(12) United States Patent  
Ikematsu et al.

(10) Patent No.: US 8,693,338 B2  
(45) Date of Patent: Apr. 8, 2014

(54) QUALITY MEASURING SYSTEM, QUALITY MEASURING APPARATUS, QUALITY MEASURING METHOD, AND PROGRAM

(75) Inventors: Ryuichi Ikematsu, Tokyo (JP); Hiroyuki Takagi, Tokyo (JP); Kazuo Takagi, Tokyo (JP); Zhenlong Cui, Tokyo (JP)

(73) Assignee: NEC Corporation, Tokyo (JP)

( * ) Notice: Subject to any disclaimer, the term of this patent is extended or adjusted under 35 U.S.C. 154(b) by 389 days.

(21) Appl. No.: 12/396,016

(22) Filed: Mar. 2, 2009

(65) Prior Publication Data

US 2010/0220612 A1    Sep. 2, 2010

(51) Int. Cl.  
*H04L 1/00* (2006.01)

(52) U.S. Cl.  
USPC .......................................... 370/236.2; 370/245

(58) Field of Classification Search  
USPC ................. 370/230, 231, 232, 233, 234, 235, 370/236.2, 245, 252, 253  
See application file for complete search history.

(56) References Cited

U.S. PATENT DOCUMENTS

| 6,374,112 B1 * | 4/2002 | Widegren et al. .......... 455/452.2 |
| 7,032,139 B1 * | 4/2006 | Iryami et al. ................. 714/704 |
| 2005/0207360 A1 * | 9/2005 | Costo et al. .................... 370/282 |

FOREIGN PATENT DOCUMENTS

JP     2003501873 A     1/2003

OTHER PUBLICATIONS

"Global Information Infrastructure, Internet Protocol Aspects and Next-Generation Networks", ITU-T Y.1731, Feb. 2008, p. 1-78.

* cited by examiner

*Primary Examiner* — Dady Chery  
(74) *Attorney, Agent, or Firm* — Sughrue Mion, PLLC (57) ABSTRACT

An exemplary object of the present invention lies in a point of providing a technology capable of measuring a transmission quality of an Ethernet network in order to utilize Ethernet as carrier-grade communication. The present invention includes an error bit number measurer for measuring the number of error bits that have occurred for a frame of Ethernet, being a target of monitoring, within a monitoring period, a transmitted bit number measurer for measuring the number of total transmitted bits of Ethernet frames that a device facing it has transmitted within the foregoing monitoring period, and a bit error rate operator for obtaining a bit error rate of a transmission path by employing a measurement result by the foregoing error bit number measurer and the foregoing transmitted bit number measurer.

13 Claims, 5 Drawing Sheets

| CONDITIONS | | | | | LOST FRAME NUMBER/RECEIVED BIT NUMBER | |
|---|---|---|---|---|---|---|
| FRAME LENGTH (byte) | FRAME LENGTH (bit) | TRANSMISSION PATH QUALITY | OCCURRENCE PROBABILITY OF ERROR OF ONE BIT OR MORE | OCCURRENCE PROBABILITY OF ERROR OF TWO BITS OR MORE | CALCULATED BER | ERROR |
| 64 | 512 | 1.E-05 | 5.11E-03 | 1.30E-05 | 1.0026E-05 | 2.5694E-03 |
| 64 | 512 | 1.E-06 | 5.12E-04 | 1.31E-07 | 1.0003E-06 | 2.5654E-04 |
| 64 | 512 | 1.E-07 | 5.12E-05 | 1.31E-09 | 1.0000E-07 | 2.5650E-05 |
| 64 | 512 | 1.E-08 | 5.12E-06 | 1.31E-11 | 1.0000E-08 | 2.5687E-06 |
| 64 | 512 | 1.E-09 | 5.12E-07 | 1.17E-13 | 1.0000E-09 | 2.3001E-07 |
| 128 | 1024 | 1.E-05 | 1.02E-02 | 5.20E-05 | 1.0051E-05 | 5.1426E-03 |
| 128 | 1024 | 1.E-06 | 1.02E-03 | 5.23E-07 | 1.0005E-06 | 5.1268E-04 |
| 128 | 1024 | 1.E-07 | 1.02E-04 | 5.24E-09 | 1.0001E-07 | 5.1251E-05 |
| 128 | 1024 | 1.E-08 | 1.02E-05 | 5.24E-11 | 1.0000E-08 | 5.1287E-06 |
| 128 | 1024 | 1.E-09 | 1.02E-06 | 4.97E-13 | 1.0000E-09 | 4.8603E-07 |
| 256 | 2048 | 1.E-05 | 2.03E-02 | 2.07E-04 | 1.0103E-05 | 1.0315E-02 |
| 256 | 2048 | 1.E-06 | 2.05E-03 | 2.09E-06 | 1.0010E-06 | 1.0252E-03 |
| 256 | 2048 | 1.E-07 | 2.05E-04 | 2.10E-08 | 1.0001E-07 | 1.0246E-04 |
| 256 | 2048 | 1.E-08 | 2.05E-05 | 2.10E-10 | 1.0000E-08 | 1.0249E-05 |
| 256 | 2048 | 1.E-09 | 2.05E-06 | 2.04E-12 | 1.0000E-09 | 9.9802E-07 |
| 512 | 4096 | 1.E-05 | 4.01E-02 | 8.16E-04 | 1.0208E-05 | 2.0768E-02 |
| 512 | 4096 | 1.E-06 | 4.09E-03 | 8.36E-06 | 1.0021E-06 | 2.0513E-03 |
| 512 | 4096 | 1.E-07 | 4.10E-04 | 8.38E-08 | 1.0002E-07 | 2.0488E-04 |
| 512 | 4096 | 1.E-08 | 4.10E-05 | 8.39E-10 | 1.0000E-08 | 2.0489E-05 |
| 512 | 4096 | 1.E-09 | 4.10E-06 | 8.28E-12 | 1.0000E-09 | 2.0220E-06 |
| 768 | 6144 | 1.E-05 | 5.96E-02 | 1.81E-03 | 1.0314E-05 | 3.1364E-02 |
| 768 | 6144 | 1.E-06 | 6.13E-03 | 1.88E-05 | 1.0031E-06 | 3.0788E-03 |
| 768 | 6144 | 1.E-07 | 6.14E-04 | 1.89E-07 | 1.0003E-07 | 3.0731E-04 |
| 768 | 6144 | 1.E-08 | 6.14E-05 | 1.89E-09 | 1.0000E-08 | 3.0729E-05 |
| 768 | 6144 | 1.E-09 | 6.14E-06 | 1.87E-11 | 1.0000E-09 | 3.0460E-06 |
| 1024 | 8192 | 1.E-05 | 7.87E-02 | 3.18E-03 | 1.0421E-05 | 4.2107E-02 |
| 1024 | 8192 | 1.E-06 | 8.16E-03 | 3.34E-05 | 1.0041E-06 | 4.1077E-03 |
| 1024 | 8192 | 1.E-07 | 8.19E-04 | 3.35E-07 | 1.0004E-07 | 4.0976E-04 |
| 1024 | 8192 | 1.E-08 | 8.19E-05 | 3.36E-09 | 1.0000E-08 | 4.0970E-05 |
| 1024 | 8192 | 1.E-09 | 8.19E-06 | 3.33E-11 | 1.0000E-09 | 4.0700E-06 |
| 1518 | 12144 | 1.E-05 | 1.14E-01 | 6.80E-03 | 1.0633E-05 | 6.3260E-02 |
| 1518 | 12144 | 1.E-06 | 1.21E-02 | 7.31E-05 | 1.0061E-06 | 6.0972E-03 |
| 1518 | 12144 | 1.E-07 | 1.21E-03 | 7.37E-07 | 1.0006E-07 | 6.0750E-04 |
| 1518 | 12144 | 1.E-08 | 1.21E-04 | 7.37E-09 | 1.0001E-08 | 6.0731E-05 |
| 1518 | 12144 | 1.E-09 | 1.21E-05 | 7.34E-11 | 1.0000E-09 | 6.0460E-06 |

QUALITY MEASURING SYSTEM, QUALITY MEASURING APPARATUS, QUALITY MEASURING METHOD, AND PROGRAM

FIELD OF THE INVENTION

The present invention relates to a technology for measuring a quality of a transmission path, and more particularly relates to a technology for measuring a quality of a transmission path between packet transmission devices for making packet communication by employing Ethernet.

RELATED ART

There exists Patent document 1 as a technology of the packet communication that guarantees a communication quality. This Patent document 1 discloses the method of utilizing an OAM (Operation Administration and Maintenance) functionality of SONET (Synchronous Optical Network)/SDH (Synchronous Digital Hierarchy), for example, byte B1, byte B2, or byte B3, thereby to monitor a communication quality by carrying a packet in a virtual container of the SONET/SDH. It is the technology relating to packet communication in a SONET/SDH network that is described in the Patent document 1, and the method of monitoring a quality in a packet network such as an Ethernet network is disclosed.

In recent years, so as to utilize Ethernet as carrier-grade communication such as the SONET/SDH, various standardization groups such as IEEE (The Institute of Electrical and Electronics Engineers, Inc.) and ITU-T (Telecommunication Standardization Sector of International Telecommunication Union) are scheming recommendation associated with an OAM functionality for managing the Ethernet network. One of them is Non-patent document 1. In this Non-patent document 1, an arrangement is described for recognizing the number of transmitted frames of a device facing its own device and the number of received frames of its own device.

Employing the number of the received frames of its own device and the number of the transmitted frames of a device facing its own device obtained by employing this technology makes it possible to compute the number of the lost frames and the frame loss ratio (FLR).

Lost frame number=transmitted frame number of a device facing its own device−received frame number of its own device (Equation 1)

Frame loss ratio=lost frame number/transmitted frame number of a device facing its own device (Equation 2)

[Patent document 1] JP-P2003-501873A (paragraph [0040])

[Non-patent document 1] ITU-T, Y, 1731 (SERIES Y: GLOBAL INFORMATION INFRASTRUCTURE, INTERNET PROTOCOL ASPECTS AND NEXT-GENERATION NETWORKS), February, 2008, p. 28, chapter 8 (Frame Loss Ratio), and p. 29 to p. 32, chapter 8.1 (Frame Loss Measurement (ETH-LM))

There exists a problem that the technology of the Ethernet of the above-mentioned Non-patent document 1 is not capable of obtaining a bit error rate that is employed in the SONET.

The first reason is that the Ethernet, which is not a network for guaranteeing a transmission path quality, does not care about a transmission quality, but attaches importance to whether information that should be communicated correctly has arrived to the other party. That is, the Ethernet has no concept of monitoring an error in a bit unit because importance is attached to whether the Ethernet frame has arrived.

The second reason is that, while an MAC (Media Access Control) unit of the reception side confirms a normality of the received Ethernet frame by employing FCS (frame Check Sequence) added to the Ethernet frame, the Ethernet frame is determined as an abnormal frame, and cancelled when a bit error within the Ethernet frame occurs in the transmission path. For this, in a location in which a quality is measured, the cancelled frame length cannot be measured, and above all, the total transmitted bit length cannot be measured.

SUMMARY OF THE INVENTION

Thereupon, an exemplary object of the present invention is to solve the above-mentioned points at issue. That is, it lies in a point of providing a technology capable of measuring a transmission path quality of the Ethernet network in order to utilize the Ethernet as carrier-grade communication.

The present invention for solving the above-mentioned problems is a quality measuring system that includes: an error bit number measurer for measuring the number of error bits that have occurred for a frame of Ethernet, being a target of monitoring, within a monitoring period; a transmitted bit number measurer for measuring the number of total transmitted bits of Ethernet frames that a device facing it has transmitted within the foregoing monitoring period; and a bit error rate operator for obtaining a bit error rate by employing a measurement result by the foregoing error bit number measurer and the foregoing transmitted bit number measurer.

The present invention for solving the above-mentioned problems is a quality measuring apparatus that includes: an error bit number measurer for measuring the number of error bits that have occurred for a frame of Ethernet, being a target of monitoring, within a monitoring period; a transmitted bit number measurer for measuring the number of total transmitted bits of Ethernet frames that a device facing it has transmitted within the foregoing monitoring period; and a bit error rate operator for obtaining a bit error rate by employing a measurement result by the foregoing error bit number measurer and the foregoing transmitted bit number measurer.

The present invention for solving the above-mentioned problems is a quality measuring method that includes: measuring the number of error bits that have occurred for a frame of Ethernet, being a target of monitoring, within a monitoring period; measuring the number of total transmitted bits of Ethernet frames that a device facing it has transmitted within the foregoing monitoring period; and obtaining a bit error rate by employing a result in the foregoing error bit number measurement and the foregoing transmitted bit number measurement.

The present invention for solving the above-mentioned problems is a record medium having a program stored therein for causing a device to execute the processes of: measuring the number of error bits that have occurred for a frame of Ethernet, being a target of monitoring, within a monitoring period; measuring the number of total transmitted bits of Ethernet frames that a device facing it has transmitted within the foregoing monitoring period; and obtaining a bit error rate by employing a result in the foregoing error bit number measuring process and the foregoing transmitted bit number measuring process.

BRIEF DESCRIPTION OF THE DRAWINGS

This and other objects, features and advantages of the present invention will become more apparent upon a reading of the following detailed description and drawings, in which:

FIG. 6 is a table illustrating a frame loss rate, a calculated bit error rate, and an error.

EXEMPLARY EMBODIMENTS

Embodiment of the present invention will be explained in details by making a reference to the accompanied drawings.

Figure 1:
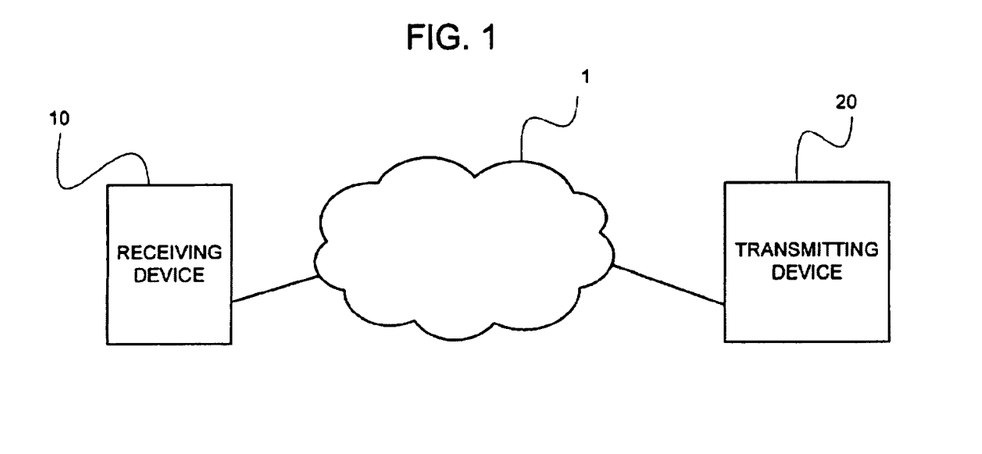
FIG. 1 is a view illustrating one example of the system of the present invention.

FIG. 1 is a view illustrating one example of the communication system of the present invention.

As shown in FIG. 1, the communication system of the present invention includes a receiving device 10 and a transmitting device 20 arranged over Ethernet 1.

The transmitting device 2C is a device for transmitting a packet.

Figure 2:
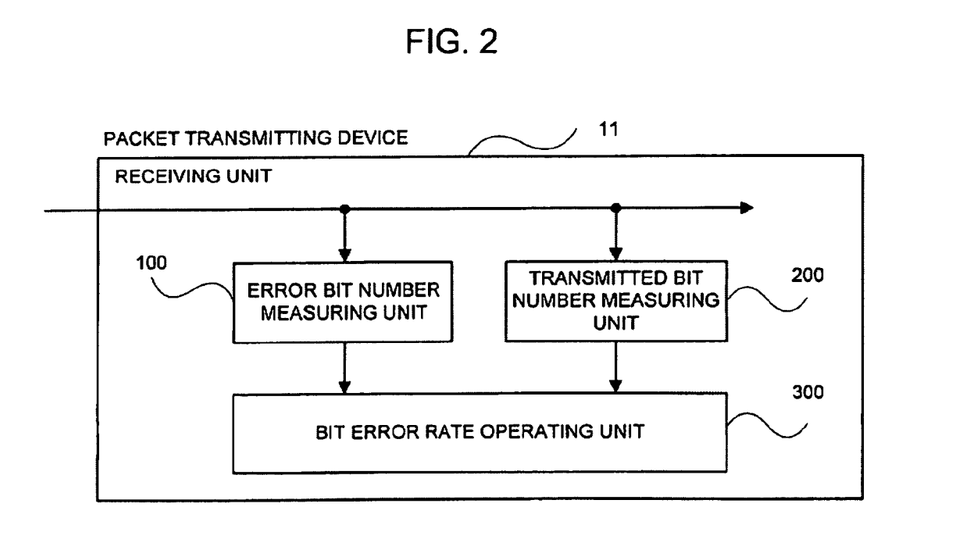
FIG. 2 is a block diagram illustrating one example of a first embodiment of the present invention.

The receiving device 10 includes a receiving unit 11 for receiving a packet from the transmitting device 20, being a device facing it. The receiving unit 11 includes an error bit number measuring unit 100, a transmitted bit number measuring unit 200, and a bit error rate operating unit 300. In FIG. 2, one example of the receiving unit 11 of the packet transmitting device is shown.

The error bit number measuring unit 100 measures the number of the error bits that have occurred within a predetermined measurement period. Herein, one example of measuring the number of the error bits will be explained. Additionally, in the present invention, the method other than the following method may be employed as a method of measuring the number of the error bits.

Figure 3:
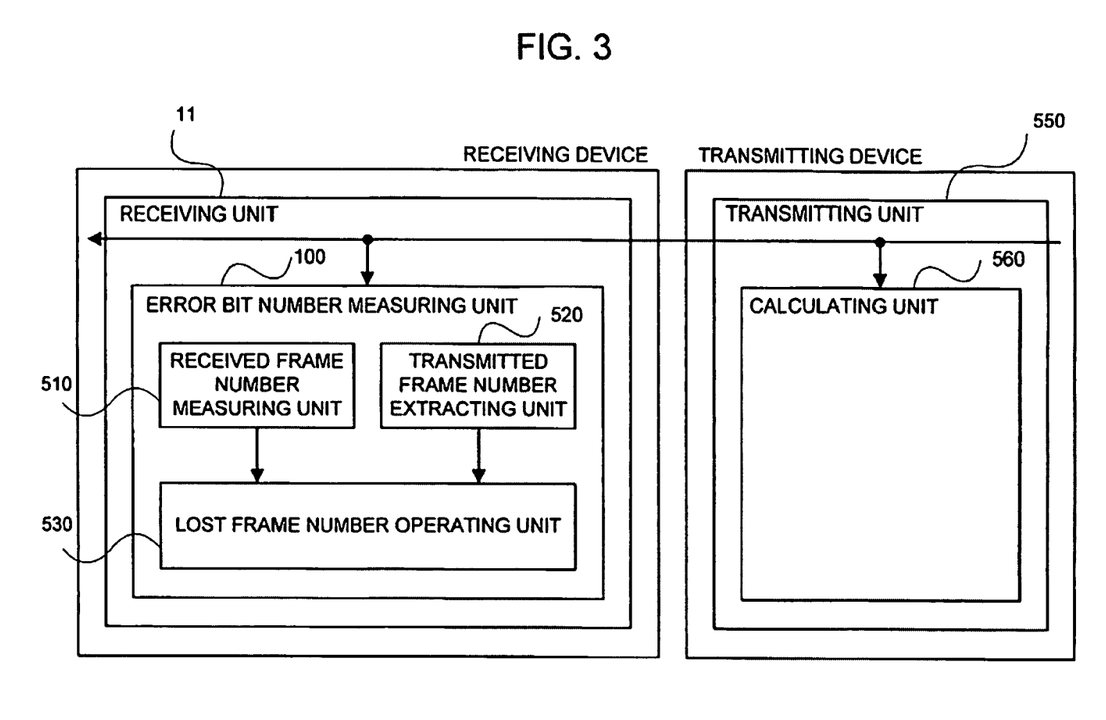
FIG. 3 is a block diagram illustrating one example of the measuring unit of the present invention.

FIG. 3 is a block diagram of the error bit number measuring unit 100. As shown in FIG. 3, the error bit number measuring unit 100 includes a received frame number measuring unit 510, a transmitted frame number extracting unit 520, and a lost frame number operating unit 530.

The received frame number measuring unit 510 measures the number of the total frames received by its own device, out of the to-be-monitored frames transmitted within a measurement period. This to-be-monitored frame is, for example, a to-be-monitored frame transmitted from the device facing it such as an OAM frame and a CCM frame (an OAM frame of dual-endedLM).

The transmitted frame number extracting unit 520 extracts the number of the frames addressed to its own device, which the device facing it have transmitted, from the to-be-monitored frames. Additionally, the transmitting device 20, being a device facing the transmitted frame number extracting unit 520, describes a value of a counter of the number of the total transmitted frames within a measurement period, which its own device keeps, in the to-be-monitored frame at the moment of transmitting the to-be-monitored frame.

The lost frame number operating unit 530 computes the number of lost frames from a difference between the number of the received frames and the number of the transmitted frames.

In such a configuration, the received frame number measuring unit 510 and the transmitted frame number extracting unit 520 performs the following operation.

The received frame number measuring unit 510, whenever receiving the to-be-monitored frame, stores the number of the total received frames at the time point of the reception. And, the received frame number measuring unit 510, when having newly received the to-be-monitored frame, obtains a difference with the number of the last-time received frames that it has stored. With this, the received frame number measuring unit 510 calculates the number of the frames received until it has newly received the to-be-monitored frame this time since it received the to-be-monitored frame last time.

The transmitted frame number extracting unit 520, whenever receiving the to-be-monitored frame, stores the number of the transmitted frames of the device facing it. And, the transmitted frame number extracting unit 520, when having newly received the to-be-monitored frame, obtains a difference with the number of the last-time received frames that it has stored. With this, the transmitted frame number extracting unit 520 calculates the number of the frames transmitted by the device facing it until it has newly received the to-be-monitored frame this time since it received the to-be-monitored frame last time.

The lost frame number operating unit 530 computes the number of the lost frames by employing the number of the received frames calculated by the received frame number measuring unit 510, and the number of the transmitted frames of the device facing it calculated by the transmitted frame number extracting unit 520.

Lost frame number=transmitted frame number of device facing it−received frame number of its own device    (Equation 1)

The error bit number measuring unit 100 regards the number of the lost frames computed by the lost frame number operating unit 530 as an error bit number.

Figure 4:
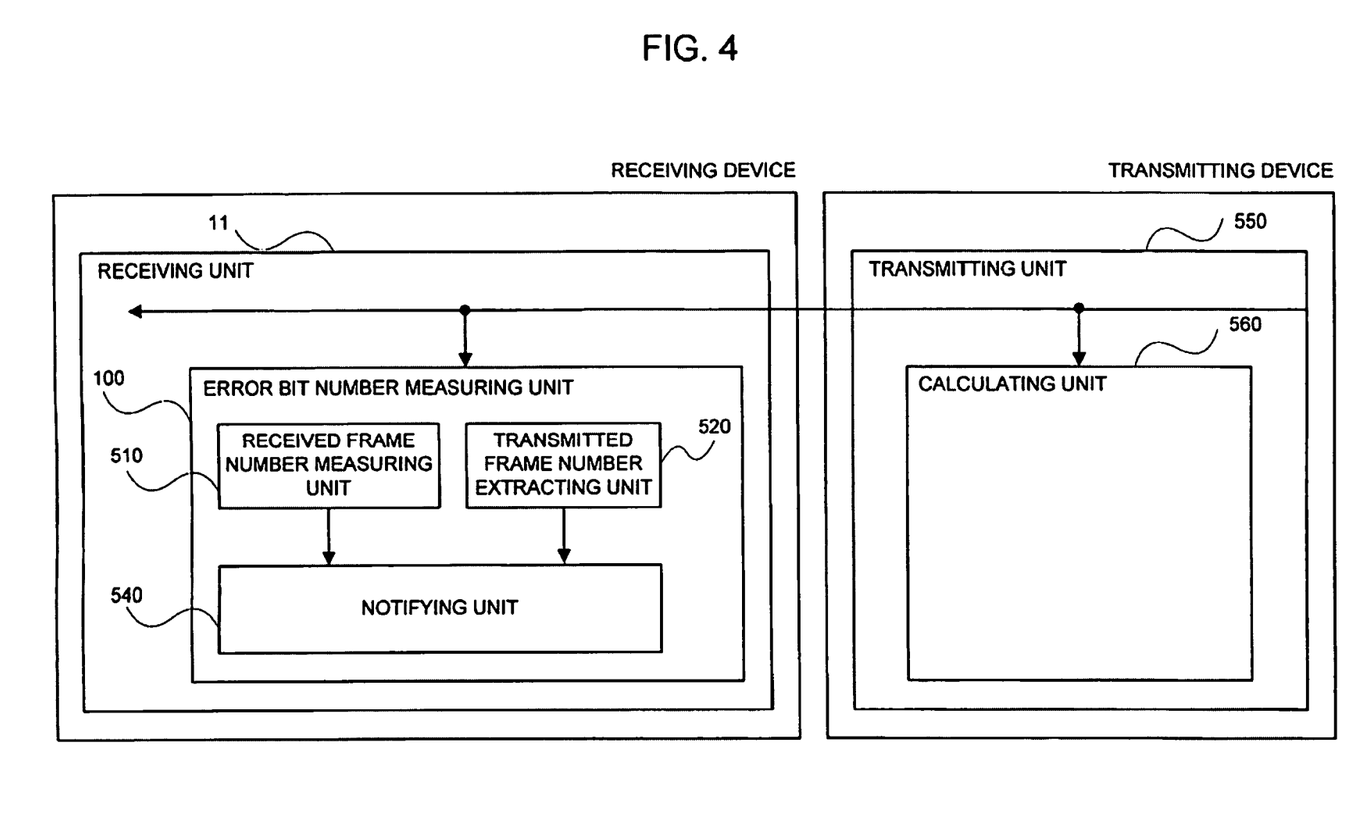
FIG. 4 is a block diagram illustrating one example of the measuring unit of the present invention.

Next, one example of measuring the number of the error bits with a method different from the foregoing will be explained. As shown in FIG. 4, the error bit number measuring unit 100 includes a received frame number measuring unit 510, a transmitted frame number extracting unit 520, and a notifying unit 540.

A transmitting unit 550 of the transmitting device 20, at the moment of transmitting the to-be-monitored frame, describes a value of a counter of the number of the total transmitted frames addressed to the receiving device 10, which its own device keeps, in the to-be-monitored frame.

The receiving device 10, when receiving the to-be-monitored frame, extracts the number of the transmitted frames of the transmitting device 20 described in the to-be-monitored frame received by the transmitted frame number extracting unit 520.

On the other hand, the received frame number measuring unit 510 measures the number of the total received frames received by its own device, out of the to-be-monitored frames coming from the transmitting device 20.

The notifying unit 540 notifies the number of the total received frames extracted by the transmitted frame number extracting unit 520, and the number of the total received frames measured by the received frame number measuring unit 510 to the transmitting device 20.

Whenever a calculating unit 560 of the transmitting unit 20 is notified of the number of the total received frames and the number of the total received frames by the receiving device 10, it stores them. And, when the calculating unit 560 is newly notified of the number, it calculates a difference between the number of this-time total transmitted frames and the number of the last-time total transmitted frames that have been stored, and a difference between the number of the this-time total received frames and the number of the last-time total received frames that have been stored. In addition hereto, it calculates the number of the lost frames by subtracting a difference between the number of the this-time total received frames and the number of the last-time total received frames from a difference between the number of the this-time total transmitted frames and the number of the last-time total transmitted frames.

The transmitting unit 550 of the transmitting device 20 notifies the number of the calculated lost frames to the receiving device 10. The error bit number measuring unit 100 regards the notified number of the lost frames as an error bit number.

Additionally, the error bit number measuring unit 100 may be configured to be installed into the transmitting device 20.

Further, as a method of measuring the number of the error bits, the method such that an MAC processing unit installed in the receiving device 10 counts the number of the frames in which a FCS error has occurred (number of the lost frames), and regards its value as an error bit number can be listed.

The transmitted bit number measuring unit 200 measures the number of the total transmitted bits of the frames that the transmitting device 20 has transmitted to the receiving device 10 within a measurement period. While any method may be employed as a method of measuring the number of the total transmitted bits, the case of regarding the number of the total transmitted bits as a total received bit number is employed for the following explanation.

The bit error rate operating unit 300 calculates a bit error rate (BER) by employing the number of the error bits coming from the error bit number measuring unit 100, and the number of the transmitted bits coming from the transmitted bit number measuring unit 200.

$$\text{Bit error rate=error bit number/transmitted bit number} \quad \text{(Equation 3)}$$

Figure 5:
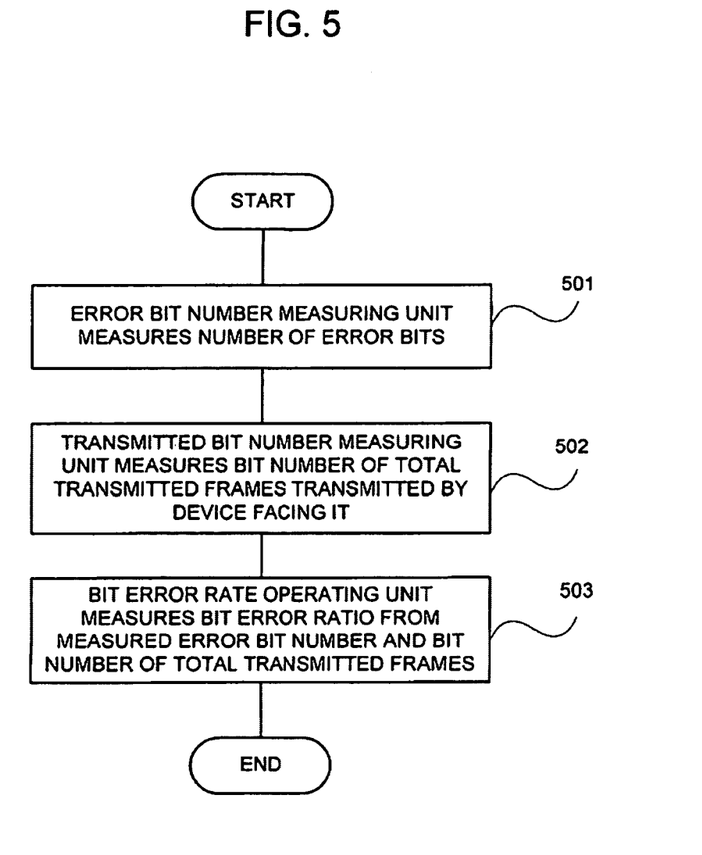
FIG. 5 is a flowchart for explaining an operation of the present invention.

Continuously, an operation of the method of measuring a transmission path quality will be explained by employing FIG. 5.

The error bit number measuring unit 100 measures the number of the error bits that have occurred within a measurement period, and delivers the measured number of the error bits to the bit error rate operating unit 300 (S501).

The transmitted bit number measuring unit 200, whenever receiving the Ethernet frame, measures and accumulates the number of the bits of the frames transmitted within a measurement period from the transmitting device 20 (S502). And, it delivers the measured number of the total transmitted bits to the bit error rate operating unit 300.

The bit error rate operating unit 300 receives the number of the error bits measured by the error bit number measuring unit 100, and the number of the total transmitted bits measured by the transmitted bit number measuring unit 200. And, it computes the bit error ratio by employing Equation 3 (S503).

Next, the reason why, in the above-mentioned explanation, the total transmitted bit number was regarded to be identical to the total received bit number in terms of the number, and the error bit number was regarded to be identical to the lost frame number in terms of the number will be explained.

At first, the reason why the total transmitted bit number was regarded to be identical to the total received bit number in terms of the number will be explained. The reason is that a range of $10^{\wedge}(-5)$ to $10^{\wedge}(-9)$ is employed as a threshold of a signal degrade (SD) in the SONET/SDH, and with the transmission path quality within this range, a ratio of the number of the lost frames to the number of the transmitted frames is sufficiently small.

Continuously, the reason why the error bit number was regarded to be identical to the lost frame number in terms of the number will be explained. The reason is that it is thinkable that a probability that an error of two bits or more occurs within one frame is very small in the case that the transmission path quality is within a range of $10^{\wedge}(-5)$ to $10^{\wedge}(-9)$, and a one-bit error almost all occurs even though the error occurs. With the Ethernet of which the transmission path quality is within a range of $10^{\wedge}(-5)$ to $10^{\wedge}(-9)$, a probability that an error of one bit or more occurs within one frame, and a probability that an error of two bits or more occurs within one frame are shown in FIG. 6.

An example shown in FIG. 6 will be explained.

Each of the values shown in the calculated BER of FIG. 6 is a numerical value calculated by employing the total transmitted bit number was regarded to be identical to the total received bit number in terms of the number and the error bit number was regarded to be identical to the lost frame number in terms of the number will be explained. The error is a value calculated by employing the BER actually measured, and Equation 4.

$$\text{Error=(calculated BER-actual BER)/actual BER} \quad \text{(Equation 4)}$$

Thus, the example in a first line of FIG. 6 is an example of having transmitted a 64-byte frame (512-bit frame) in the transmission path quality of 1.E-5. In this case, a probability that an error of one bit or more exists within one frame (=lost frame ratio) becomes 5.11E-3. If one million frames are transmitted, the number of the lost frames and the number of the received frames behave like the followings.

Lost frame number=(transmitted frame number)*(lost frame ratio)=1E6*(5.11E-3)=5.11E3

Received bit number=(transmitted frame number-lost frame number)*(frame length)=(1E6-5.11E3)*512 (bits) =509383680. Thus, calculating the calculated BER by employing Equation 3 yields calculated BER=5.11E3/509383680=1.0026E-5.

Originally, the actual BER is 1.0E-5, so calculating a difference between the calculated BER and the actual BER by employing Equation 4 yields (calculated BER-actual BER)/actual BER=(1.0026E-5-1.00E-5)/1.00E-5=2.6E-3. Additionally, this error stems from existence of two bit errors or more within in one frame or the case of the actual transmitted bit number more than the actual received bit number.

By taking the fact that the above-mentioned text explains an example described in FIG. 6 into consideration, the explanation will be made below.

A probability that an error of one bit or more occurs becomes identical to the frame loss probability in the sense of the word. In FIG. 6, upon viewing an occurrence probability of an error of one bit or more, it can be seen that the number of the lost frames, as compared with the number of the received frames, is sufficiently small except one part. Further, In FIG. 6, upon comparing an occurrence probability of an error of one bit or more with an occurrence probability of an error of two bits or more, it can be seen that an error of one bit or more occurs in almost all cases. Thus, the number of the error bits that occur within one lost frame is regard as one bit, thereby enabling the number of the lost frames that have occurred within a monitoring period to be defined as an error bit number within a monitoring period.

From the foregoing, Equation 5 holds.

$$\text{Bit error ratio (BER)=error bit number/total transmitted bit number≈lost frame number/total received bit number} \quad \text{(Equation 5)}$$

Thus, the bit error rate can be calculated by regarding the total transmitted bit number to be identical to the total received bit number, and regarding the error bit number to be identical to the lost frame number.

Additionally, as apparent from a reference to FIG. 6, an occurrence probability of the error bit is larger with the case that the transmission path quality is poor, and an occurrence probability of the error bit is larger with the case that the frame length is long. For this, the worst condition, out of the conditions shown in FIG. 6, is the case that the frame length is 1,518 bytes, and yet the transmission quality is $10^{(-5)}$. Also in this case, the transmission path quality calculated by regarding the total transmitted bit number to be identical to the total received bit number enables the bit error rate to be calculated at an error of less than 10% as compared the actual transmission path quality. While FIG. 6 shows a probability of the case that the frames having an identical length are transmitted/received, there is no possibility that a result in the case that the frames having different lengths coexist becomes worse than a result in the foregoing worst condition.

Further, in the foregoing, the calculation precision is stochastically showed in the measurement of the transmission path quality of the Ethernet. As apparent from the foregoing contents, satisfying the required precision necessitates deciding a parameter of the frame that becomes a target of monitoring, for example, the monitoring period. As a rule, so as to calculate the bit error rate of $10^{(-N)}$, it is said that approx. $10^{(N+2)}$ bits as a to-be-monitored bit number are required.

The present invention described above is applicable to not only the quality measurement of the transmission path between two packet transmitting devices that face each other, but also the pass of the packet that goes through one packet transmitting device or more existing between two packet transmitting devices that face each other. In this case, however, an influence of frame cancellation that might occurs in the case that congestion of a packet switch existing in the way is generated need to be taken into consideration.

An effect of the present invention is that the bit error ratio of the Ethernet transmission path, which has not been calculated so far, can be calculated. This makes it possible to specify the transmission path of which the transmission quality has been degraded, and to take a countermeasure therefor by employing the calculated bit error ratio, which enables the carrier-grade service keeping a constant quality to be provided at any time.

Further, the present invention makes the calculation of the bit error ratio of the Ethernet transmission path easy because the error bit number is regarded to be identical to the lost frame number in terms of the number, and the total transmitted bit number is regarded to be identical to the total received bit number in terms of the number.

In addition hereto, employing the present invention enables the communication quality of the Ethernet to be guaranteed.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined by the claims.

What is claimed is:

1. A quality measuring system comprising:
   a first device to transmit Ethernet frames; and
   a second device to receive said Ethernet frames;
   wherein said first device transmits a to-be-monitored frame including information indicating a number of total transmitted Ethernet frames addressed to said second device,
   wherein said second device includes:
   a receiving unit to receive said to-be-monitored frame from said first device;
   an extracting unit to extract said information indicating said number of total transmitted Ethernet frames from said to-be-monitored frame;
   a received frame number measuring unit to measure a number of total received Ethernet frames that said second device receives;
   a lost frame number operating unit to calculate a number of lost frames based on said number of total transmitted Ethernet frames and said number of total received Ethernet frames;
   a transmitted bit number measuring unit to measure a number of total transmitted bits of said total transmitted Ethernet frames addressed to said second device; and
   a bit error ratio operating unit to calculate a bit error ratio based on said number of lost frames and said number of total transmitted numbers.

2. The quality measuring system according to claim 1, wherein said first device transmits said to-be-monitored frame which includes said information indicating said number of total transmitted Ethernet frames that said first device transmits to said second device within a predetermined measurement period,
   wherein said received frame number measuring unit measures said number of total received Ethernet frames that said second device receives within said predetermined measurement period, and
   wherein said transmitted bit number measuring unit measures said number of total transmitted bits of said total transmitted Ethernet frames that said first device transmits to said second device within said predetermined measurement period.

3. The quality measuring system according to claim 1, wherein said lost frame number operating unit calculates said number of lost frames by subtracting said number of total received Ethernet frames from said number of total transmitted Ethernet frames.

4. The quality measuring system according to claim 1 wherein said bit error ratio operating unit calculates said bit error ratio by dividing said number of lost frames by said number of total transmitted bits.

5. A quality measuring apparatus comprising:
   a receiving unit to receive a to-be-monitored frame from a first device to transmit Ethernet frames, said quality measuring apparatus being a second device to receive said Ethernet frames;
   an extracting unit to extract said information indicating said number of total transmitted Ethernet frames from said to-be-monitored frame;
   a received frame number measuring unit to measure a number of total received Ethernet frames that said second device receives;
   a lost frame number operating unit to calculate a number of lost frames based on said number of total transmitted Ethernet frames and said number of total received Ethernet frames;
   a transmitted bit number measuring unit to measure a number of total transmitted bits of said total transmitted Ethernet frames addressed to said second device; and
   a bit error ratio operating unit to calculate a bit error ratio based on said number of lost frames and said number of total transmitted numbers.

6. The quality measuring apparatus according to claim 5, wherein said first device transmits said to-be-monitored frame which includes said information indicating said number of total transmitted Ethernet frames that said first device transmits to said second device within a predetermined measurement period,
wherein said received frame number measuring unit measures said number of total received Ethernet frames that said second device receives within said predetermined measurement period, and
wherein said transmitted bit number measuring unit measures said number of total transmitted bits of said total transmitted Ethernet frames that said first device transmits to said second device within said predetermined measurement period.

7. The quality measuring apparatus according to claim 5, wherein said lost frame number operating unit calculates said number of lost frames by subtracting said number of total received Ethernet frames from said number of total transmitted Ethernet frames.

8. The quality measuring apparatus according to claim 5, wherein said bit error ratio operating unit calculates said bit error ratio by dividing said number of lost frames by said number of total transmitted bits.

9. A quality measuring method comprising:
receiving a to-be-monitored frame from a first device to transmit Ethernet frames, said to be-monitored frame received by a receiving unit of a second device to receive said Ethernet frames;
extracting, by an extracting unit of said second device, said information indicating said number of total transmitted Ethernet frames from said to-be-monitored frame;
measuring, by a received frame number measuring unit of said second device, a number of total received Ethernet frames that said second device receives;
calculating by a lost frame number operating unit of said second device a number of lost frames based on said number of total transmitted Ethernet frames and said number of total received Ethernet frames;
measuring, by a transmitted bit number measuring unit of said second device, a number of total transmitted bits of said total transmitted Ethernet frames addressed to said second device; and
calculating by a bit error ratio operating unit of said second device a bit error ratio based on said number of lost frames and said number of total transmitted numbers.

10. The quality measuring method according to claim 9, wherein said first device transmits said to-be-monitored frame which includes said information indicating said number of total transmitted Ethernet frames that said first device transmits to said second device within a predetermined measurement period,
wherein said received frame number measuring unit measures said number of total received Ethernet frames that said second device receives within said predetermined measurement period, and
wherein said transmitted bit number measuring unit measures said number of total transmitted bits of said total transmitted Ethernet frames that said first device transmits to said second device within said predetermined measurement period.

11. The quality measuring method according to claim 9, wherein said lost frame number operating unit calculates said number of lost frames by subtracting said number of total received Ethernet frames from said number of total transmitted Ethernet frames.

12. The quality measuring method according to claim 9, wherein said bit error ratio operating unit calculates said bit error ratio by dividing said number of lost frames by said number of total transmitted bits.

13. A non-transitory computer-readable recording medium having a program stored therein to execute the process of:
receiving a to-be-monitored frame from a first device to transmit Ethernet frames, said to- be-monitored frame received by a receiving unit of a second device to receive said Ethernet frames;
extracting, by an extracting unit of said second device, said information indicating said number of total transmitted Ethernet frames from said to-be-monitored frame;
measuring, by a received frame number measuring unit of said second device, a number of total received Ethernet frames that said second device receives;
calculating, by a lost frame number operating unit of said second device a number of lost frames based on said number of total transmitted Ethernet frames and said number of total received Ethernet frames;
measuring, by a transmitted bit number measuring unit of said second device, a number of total transmitted bits of said total transmitted Ethernet frames addressed to said second device; and
calculating b a bit error ratio operating unit of said second device a bit error ratio based on said number of lost frames and said number of total transmitted numbers.

\* \* \* \* \*